(12) United States Patent
Bang

(10) Patent No.: US 12,127,081 B2
(45) Date of Patent: Oct. 22, 2024

(54) PUSH-TO-TALK DEVICE

(71) Applicant: UNIONPLACE CO., LTD., Seoul (KR)

(72) Inventor: Seongcheol Bang, Seoul (KR)

(73) Assignee: UNIONPLACE CO., LTD., Seoul (KR)

( * ) Notice: Subject to any disclaimer, the term of this patent is extended or adjusted under 35 U.S.C. 154(b) by 421 days.

(21) Appl. No.: 17/561,584

(22) Filed: Dec. 23, 2021

(65) Prior Publication Data
US 2022/0116748 A1    Apr. 14, 2022

Related U.S. Application Data

(63) Continuation of application No. PCT/KR2021/009258, filed on Jul. 19, 2021.

(30) Foreign Application Priority Data

Sep. 17, 2020    (KR) .................. 10-2020-0119685

(51) Int. Cl.
*H04W 4/10* (2009.01)
*H04L 5/00* (2006.01)
(Continued)

(52) U.S. Cl.
CPC ............. *H04W 4/10* (2013.01); *H04L 5/0053* (2013.01); *H04L 67/55* (2022.05); *H04W 4/12* (2013.01)

(58) Field of Classification Search
CPC ... H04L 5/0053; H04L 5/0055; H04L 12/185; H04L 12/1859; H04L 65/1059;
(Continued)

(56) References Cited

U.S. PATENT DOCUMENTS

2002/0150091 A1* 10/2002 Lopponen ............. H04W 76/45
370/389
2004/0236780 A1* 11/2004 Blevins .................. G06F 9/546
707/999.102
(Continued)

FOREIGN PATENT DOCUMENTS

KR    10-2001-0112732 A    12/2001
KR        10-0649262 B1    11/2006
(Continued)

OTHER PUBLICATIONS

Korean Office Action dated Oct. 26, 2020, issued to Korean Application No. 10-2020-0119685.
(Continued)

*Primary Examiner* — Ayaz R Sheikh
*Assistant Examiner* — David Zhijun Sung
(74) *Attorney, Agent, or Firm* — Stein IP, LLC

(57) ABSTRACT

A push-to-talk device is provided. The push-to-talk device includes a communication interface, a storage configured to store identification information of a plurality of push-to-talk devices included in a network group, and an operation processor electrically connected to the communication interface and the storage. The operation processor is configured to (a) designate one or more push-to-talk devices that are allowed to subscribe to a first message among the plurality of push-to-talk devices, and (b) transmit the first message to the plurality of push-to-talk devices by using a publisher-subscriber pattern through the communication interface.

16 Claims, 7 Drawing Sheets

(51) Int. Cl.
*H04L 67/55* (2022.01)
*H04W 4/12* (2009.01)

(58) Field of Classification Search
CPC ............. H04L 65/4015; H04L 65/4038; H04L 65/4061; H04L 65/611; H04L 67/55; H04W 4/10; H04W 4/12
See application file for complete search history.

(56) References Cited

U.S. PATENT DOCUMENTS

| | | | | |
|---|---|---|---|---|
| 2014/0113672 | A1* | 4/2014 | Lindner | H04W 4/10 455/518 |
| 2015/0039734 | A1* | 2/2015 | King | H04L 12/1859 709/221 |
| 2020/0366658 | A1* | 11/2020 | Bang | H04L 9/14 |

FOREIGN PATENT DOCUMENTS

| | | | | |
|---|---|---|---|---|
| KR | 10-2009-0084350 | A | 8/2009 | |
| KR | 10-1336877 | B1 | 12/2013 | |
| KR | 10-1940983 | B1 | 1/2019 | |
| KR | 1940983 | B1 * | 1/2019 | ........... H04L 12/185 |
| KR | 10-2019-0019155 | A | 2/2019 | |
| KR | 10-2020-0052172 | A | 5/2020 | |
| KR | 10-2138484 | B1 | 7/2020 | |
| KR | 10-2212205 | B1 | 2/2021 | |

OTHER PUBLICATIONS

Request for Preferential Examination dated Sep. 17, 2020, issued to Korean Application No. 10-2020-0119685.
International Search Report dated Oct. 21, 2021, issued to International Application No. PCT/KR2021/009258.

* cited by examiner

FIG. 4

| MESSAGE SERIAL NUMBER | PUBLISHER IDENTIFICATION INFORMATION | SUBSCRIBER IDENTIFICATION INFORMATION |
|---|---|---|
| SUB-MESSAGE SERIAL NUMBER | DELIVERY PRIORITY | MESSAGE PAYLOAD |

| SUB-NETWORK GROUP | PUBLISHER | SUBSCRIBER |
|---|---|---|
| FIRST SUB-NETWORK GROUP | PTT DEVICE 100-1 | PTT DEVICE 100-2, PTT DEVICE 100-4 |
| SECOND SUB-NETWORK GROUP | PTT DEVICE 100-2 | PTT DEVICE 100-1, PTT DEVICE 100-3, PTT DEVICE 100-4 |
| THIRD SUB-NETWORK GROUP | PTT DEVICE 100-1, PTT DEVICE 100-2 | PTT DEVICE 100-3, PTT DEVICE 100-4 |
| FOURTH SUB-NETWORK GROUP | PTT DEVICE 100-1 | PTT DEVICE 100-2 |
| FIFTH SUB-NETWORK GROUP | PTT DEVICE 100-2 | PTT DEVICE 100-1 |

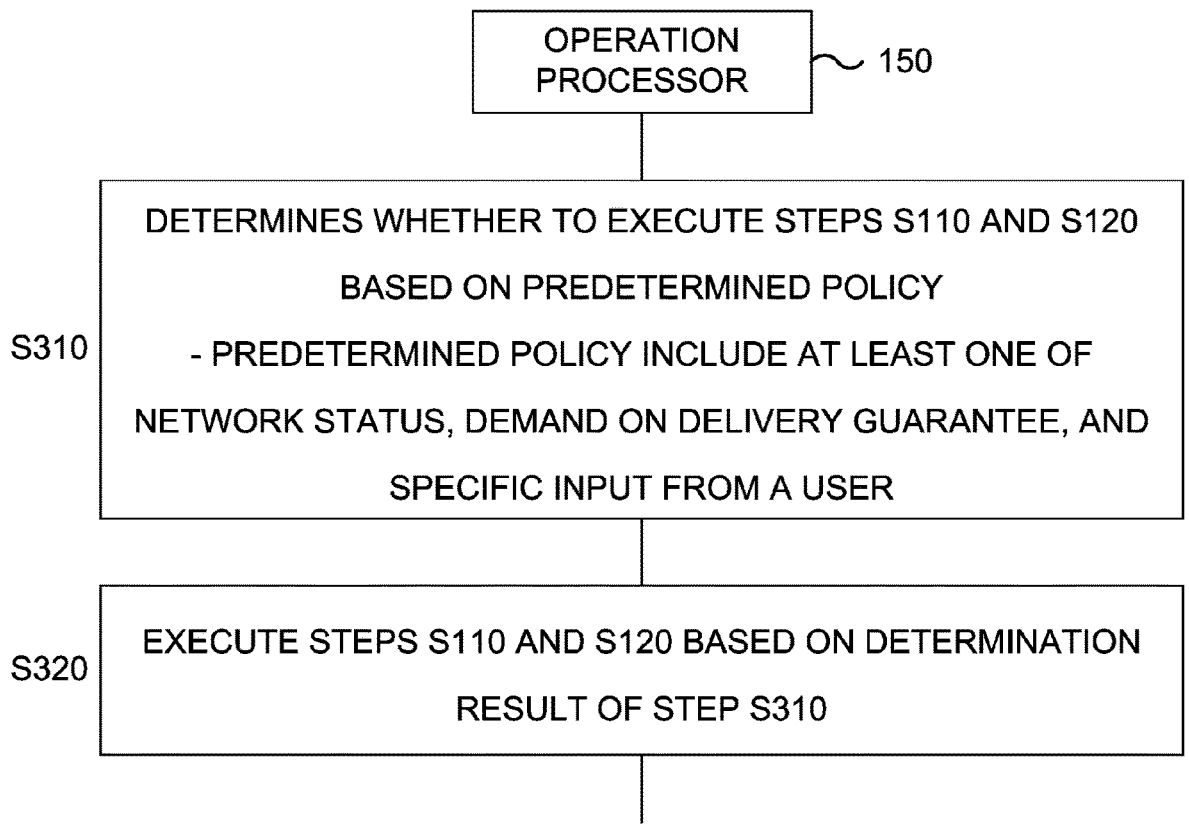

PUSH-TO-TALK DEVICE

CROSS-REFERENCE TO RELATED PATENT APPLICATION

This application is a bypass continuation of International Application No. PCT/KR2021/009258, filed on Jul. 19, 2021, in the WIPO, and Korean Patent Application No. 10-2020-0119685, filed on Sep. 17, 2020, in the Korean Intellectual Property Office, the entire contents of which are hereby incorporated by reference.

BACKGROUND

1. Field

The present disclosure relates to a push-to-talk device, and more particularly, to a push-to-talk device using a publisher-subscriber pattern.

This work was supported by Institute of Information & communications Technology Planning & Evaluation (IITP) grant funded by the Korea government (MSIT) (Research Project Title: "LTE-R 5G integrated-control container on next generation railway communication", Project unique No.: 1711139161).

2. Description of the Related Art

A push-to-talk service (hereinafter, also referred to as "PTT") is a communication service provided in a "press and speak" manner. A push-to-talk device (hereinafter, also referred to as a "PTT device") is an interface for acquiring a floor (e.g., a talk burst authority or a media burst authority). For example, the interface for acquiring the floor may commonly referred to as a "button" and may be configured as at least one of a physical input interface and a graphical user interface displayed on a screen. Among a plurality of PTT devices (e.g., a first PTT device, a second PTT device, and a third PTT device), a PPT device that has acquired the floor may transmit a message to other PTT devices. The floor is not granted to two or more PTT devices at the same time. That is, the floor is granted to only one PTT device at a time. For example, among the plurality of PTT devices including the first PTT device, the second PTT device, and the third PTT device, when the first PTT device acquires the floor, the first PTT device is only allowed to transmit a message while the second PTT device and the third PTT device are only allowed to receive the message. Further, when the second PTT device acquires the floor, the second PTT device is only allowed to transmit a message, and the first PTT device and the third PTT device are only allowed to receive the message. The PTT service may be used for monitoring and controlling communications in various sites including railways, roads, power plants, transmission and distribution facilities, production facilities and business facilities.

The PTT service may be implemented by performing, for example, communication using a plurality of network sessions through a unicast scheme or performing communication using a single network session through a multicast scheme. In other words, the first PTT device transmits a message to a server providing the PTT service, and the server transmits the message to the second PTT device and the third PTT device through the unicast scheme or the multicast scheme. Therefore, when the server does not operate normally, the PTT service cannot be provided normally. For example, the server may sequentially or simultaneously transmit the message to target PTT devices to which the message is to be transmitted, among the plurality of PTT devices. If the server is not used, one of the plurality of PTT devices (e.g., the first PTT device) only has the floor and transmits the message, and other PTT devices (e.g., the second PTT device and the third PTT device) do not have the floor so that they are only allowed to receive the message.

The PTT service using the multicast scheme can save bandwidth compared to the PTT service using the unicast scheme. According to the PTT service using the multicast scheme, for example, one PTT device may transmit a message to a plurality (e.g., 1,000) of PTT devices. However, the PTT service using the multicast communication scheme cannot guarantee a message delivery.

For example, a mission-critical PTT service may be provided using the unicast scheme or the multicast scheme. However, as described above, the communication load increases when the unicast scheme is used, and the message delivery cannot be guaranteed when the multicast scheme is used.

RELATED ART DOCUMENT

Patent Document

Patent Document 1: Korean Patent No. 10-1336877
Patent Document 2: Korean Patent Application Publication No. 10-2020-0052172
Patent Document 3: Korean Patent Application Publication No. 10-2019-0019155

SUMMARY

In view of the above, the present disclosure provides a push-to-talk device capable of being used in a mission-critical PTT service with which a message is delivered regardless of the use of a server and the message delivery is guaranteed, and also performing one-way communication or two-way communication between one-to-many or many-to-many devices.

In accordance with an embodiment of the present disclosure, there is provided a push-to-talk device including: a communication interface; a storage configured to store identification information of a plurality of push-to-talk devices included in a network group; and an operation processor electrically connected to the communication interface and the storage. The operation processor is configured to (a) designate one or more push-to-talk devices that are allowed to subscribe to a first message among the plurality of push-to-talk devices, and (b) transmit the first message to the plurality of push-to-talk devices by using a publisher-subscriber pattern through the communication interface.

According to the embodiment of the present disclosure, a push-to-talk service using a publisher-subscriber pattern is provided so that the push-to-talk service can be used as a mission-critical PTT service with which a message is delivered regardless of the use of a server and the message delivery is guaranteed, and also can provide one-way communication or two-way communication between one-to-many or many-to-many devices. Further, by transmitting a message using a multicast scheme, it is possible to reduce a bandwidth required to transmit the message. Further, it is also possible to provide various types of device-to-device communication within one network session.

BRIEF DESCRIPTION OF THE DRAWINGS

FIG. 4 is a diagram schematically illustrating information included in a first message in the PTT device according to the first embodiment.

FIG. 9 is a diagram illustrating an example of processing performed by an operation processor of the PTT device according to the second embodiment.

DETAILED DESCRIPTION

Figure 1:
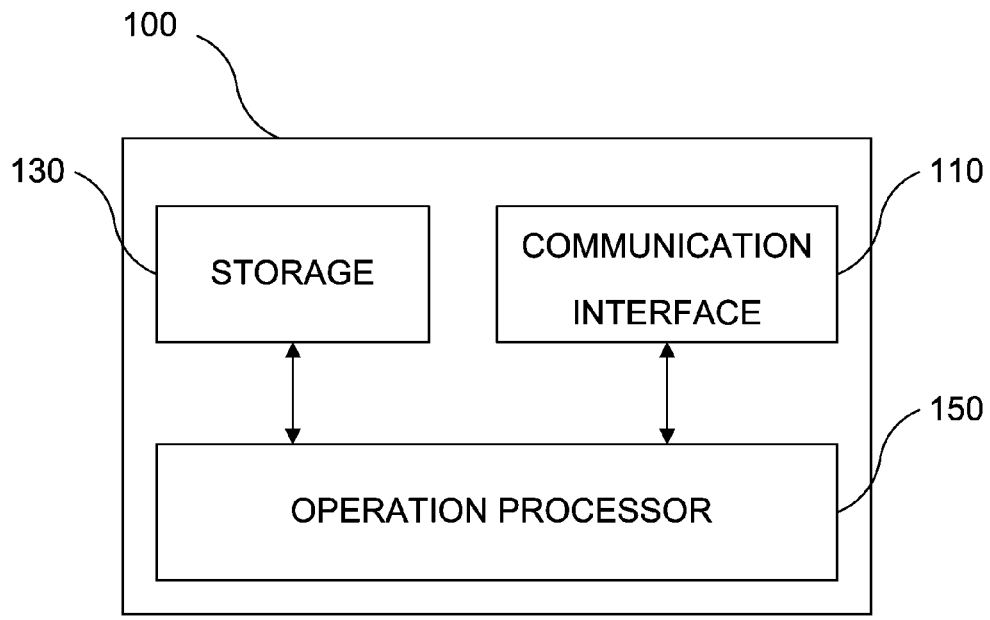
FIG. 1 is a diagram illustrating an example of a configuration of a push-to-talk (PTT) device according to a first embodiment of the present disclosure.

Hereinafter, an embodiment of a push-to-talk device according to a technique described in the present disclosure will be described in detail with reference to the accompanying drawings. Meanwhile, in the drawings for describing the embodiments of the techniques of the present disclosure, for the sake of convenience of description, only a part of the practical configurations may be illustrated or the practical configurations may be illustrated while a part of the practical configurations is omitted or changed. Further, relative dimensions and proportions of parts therein may be exaggerated or reduced in size.

First Embodiment

Figure 2:
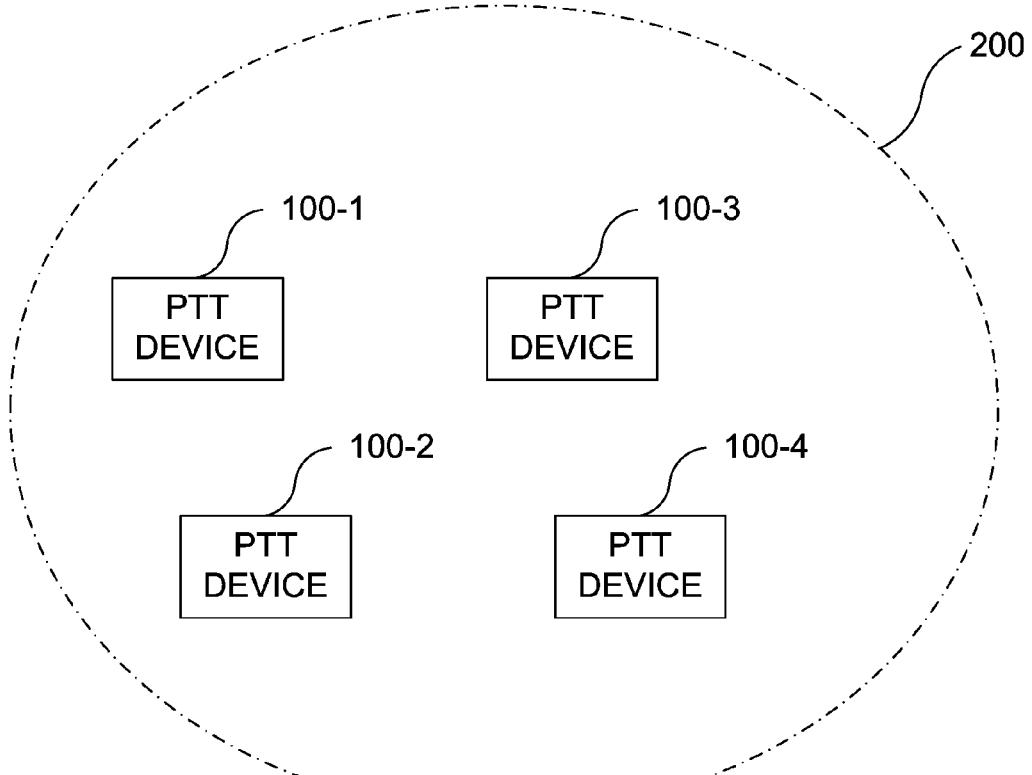
FIG. 2 is a diagram illustrating an exemplary environment in which the PTT device according to the first embodiment is used.

FIG. 1 is a diagram illustrating an example of a configuration of a push-to-talk device according to a first embodiment of the present disclosure. FIG. 2 is a diagram illustrating an exemplary environment in which the push-to-talk device according to the first embodiment is used.

Referring to FIG. 1, a push-to-talk device (PTT device) 100 according to the first embodiment includes a communication interface 110, a storage 130, and an operation processor 150. Referring to FIG. 2, a plurality of PTT devices, for example, a PTT device 100-1, a PTT device 100-2, a PTT device 100-3, and a PTT device 100-4 are disposed in a network group 200. Although the case having the four PTT devices 100-1 to 100-4 is described as an example in the first embodiment, the number of PTT devices that can be disposed in the network group 200 is not limited thereto. For example, 10,000 PTT devices may be disposed in the network group 200. Each or all of the plurality of PTT devices, for example, the PTT devices 100-1 to 100-4 in the network group 200 may be used as the PTT device 100 according to the first embodiment. Hereinafter, the PTT device 100-1 is mainly referred to as the PTT device 100, but each or all of the PTT devices 100-1 to 100-4 may be referred to as the PTT device 100.

The communication interface 110 is configured to communicate with the plurality of PTT devices included in the network group 200. For example, the communication interface 110 of the PTT device 100-1 is configured to perform communication with the PTT device 100-2, the PTT device 100-3, and the PTT device 100-4. Preferably, the communication interface 110 is configured to perform communication with the plurality of PTT devices included in the network group 200 without using a server that provides a PTT service. Alternatively, the communication interface 110 may be configured to perform communication with the plurality of PTT devices either using the server that provides the PTT service or without using the server that provides the PTT service. The communication interface 110 may perform communication with the plurality of PTT devices using, for example, at least one of a unicast scheme and a multicast scheme. The communication interface 110 may be implemented using, for example, a semiconductor device such as a communication semiconductor chip.

The storage 130 is configured to store identification information of the plurality of PTT devices included in the network group 200. For example, the storage 130 of the PTT device 100-1 stores identification information of the PTT device 100-2, the PTT device 100-3, and the PTT device 100-4. The storage 130 of the PTT device 100-1 may further store identification information of the PTT device 100-1. The storage 130 may be implemented using, for example, a semiconductor device such as a semiconductor memory.

The identification information of the PTT device 100-2 may include, for example, information such as unique identification information and a network address of the PTT device 100-2.

The operation processor 150 is electrically connected to the communication interface 110 and the storage 130. The operation processor 150 is configured to perform processing to be described later according to the technique disclosed herein. The details of the processing performed by the operation processor 150 will be described later. The operation processor 150 may be implemented by, for example, a semiconductor device (i.e., a processor) such as a central processing unit (CPU). More specifically, the operation processor 150 may include one or more processors (not shown). Each of the one or more processors is configured to perform at least part of the processing to be described later performed by the operation processor 150.

Figure 3:
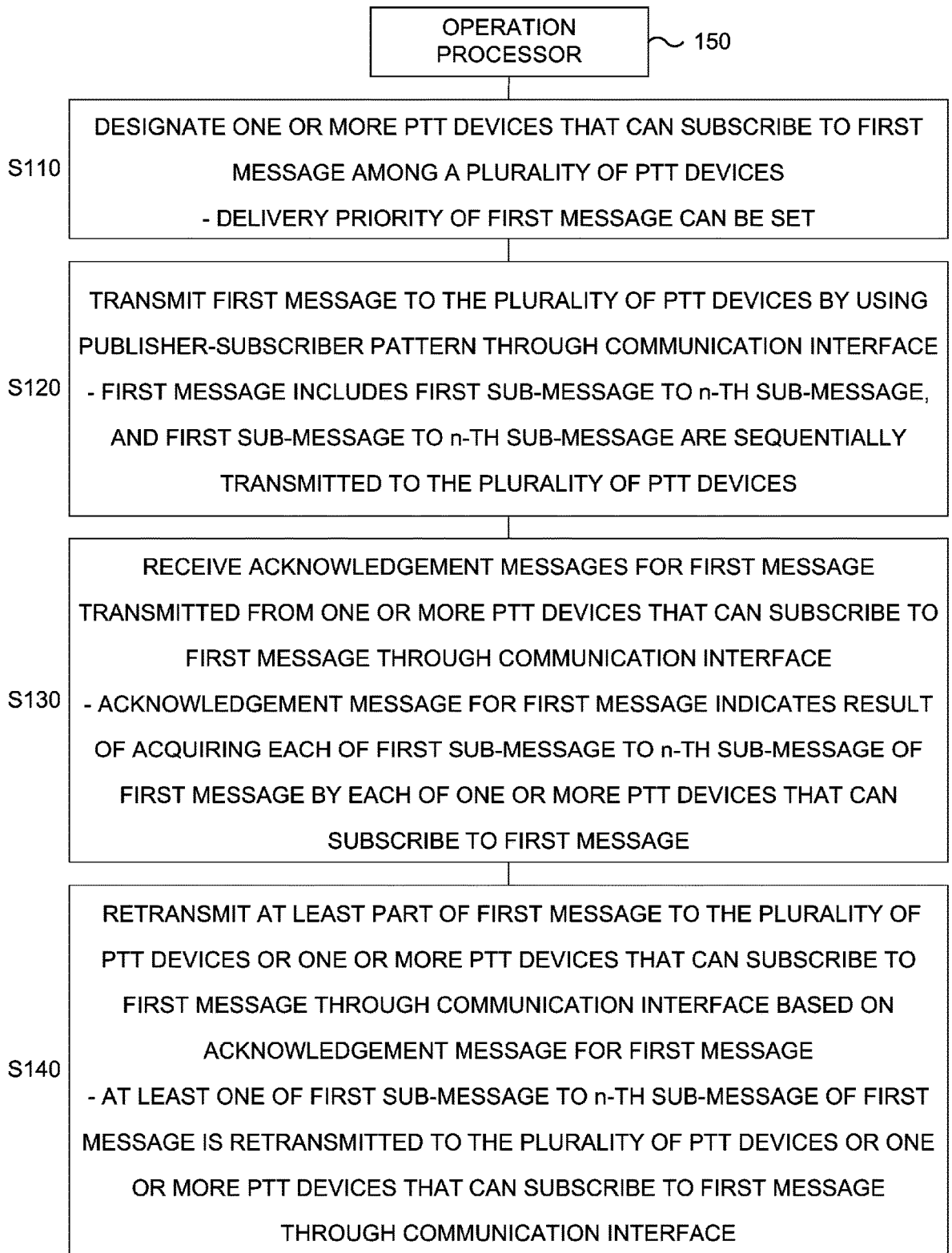
FIG. 3 is a diagram illustrating an example of processing performed by an operation processor of the PTT device according to the first embodiment.

FIG. 3 is a diagram illustrating an example of processing performed by the operation processor of the PTT device according to the first embodiment.

Referring to FIG. 3, the processing performed by the operation processor 150 of the PTT device 100 when the PTT device 100 transmits a first message is exemplarily illustrated.

First, the operation processor 150 designates one or more devices as subscribers of the first message among the plurality of devices included in the network group 200 (step S110). For example, among the PTT device 100-2, the PTT device 100-3, and the PTT device 100-4, the operation processor 150 of the PTT device 100-1 may designate the PTT device 100-2 and the PTT device 100-4 as the one or more devices that can be the subscribers of the first message. The operation processor 150 may designate the one or more devices as the subscribers of the first message among the plurality of devices included in the network group 200 by using, for example, identification information of the plurality of devices stored in the storage 130. Further, the operation processor 150 may set the delivery priority of the first message. The delivery priority indicates that, for example, the first message is transmitted prior to other messages when the first message is a disaster information message.

Next, the operation processor 150 transmits the first message to the plurality of devices included in the network group 200 by using the publisher-subscriber pattern through the communication interface 110 (step S120). As an example of the publisher-subscriber pattern, a data distribution service (DDS) may be used. Preferably, when the publisher-subscriber pattern is used, the communication interface 110 transmits the first message to the plurality of devices included in the network group 200 using the multicast scheme. That is, compared to the case of transmitting the first message to the plurality of devices included in the network group 200 using the unicast scheme, using the multicast scheme may reduce and save the bandwidth used for transmitting the first message to the plurality of devices included in the network group 200. According to the publisher-subscriber pattern used in the first embodiment, one or more publishers may exist in the network group 200 and subscribers may be designated in various ways. For example, among the plurality of devices included in the network group 200, all devices except for a device designated as the publisher may become the subscribers, or only devices designated as the subscribers may become the subscribers.

More specifically, in step S120, the first message is transmitted to all of the plurality of devices included in the network group 200. However, as will be described later, only one or more devices designated to subscribe the first message (i.e., the subscribers of the first message) in step S120 may receive the first message.

The PTT device 100 and the one or more devices designated as the subscribers of the first message among the plurality of devices included in the network group 200 may form a first sub-network group of the network group 200. The first sub-network group is a virtual network group. In the first sub-network group, the PTT device 100, that is, the PTT device 100-1 operates as the publisher, and the one or more devices, for example, the PTT device 100-2 and the PTT device 100-4, operate as the subscribers of the first message among the plurality of devices included in the network group 200.

Therefore, within one network session, the PTT device 100 may perform various push-to-talk communications. For example, the first message may be transmitted to a plurality of devices included in the network group 200 through the communication interface 110 so as to be delivered only to the first sub-network group, and a third message is transmitted to a plurality of devices included in the network group 200 through the communication interface 110 so as to be delivered only to one or more devices designated as the subscribers of the third message among the plurality of devices included in the network group 200. The one or more devices designated as the subscribers of the third message among the plurality of devices included in the network group 200 may form a third sub-network group of the network group 200. The third sub-network group is a virtual network group.

Accordingly, through steps S110 and S120, the PTT device 100 may perform various push-to-talk communications using only one network session without using a plurality of network sessions.

FIG. 4 is a diagram schematically illustrating information included in the first message in the PTT device according to the first embodiment.

A "message serial number" is the serial number of the first message.

A "publisher identification information" is identification information of a publisher of the first sub-network group, that is, identification information of the PTT device 100. The publisher identification information may further include identification information of another device that can operate as a publisher among the plurality of devices included in the network group 200 or the first sub-network group. In other words, when two or more publishers exist in the network group 200 or the first sub-network group, the publisher identification information may further include identification information of other publishers in addition to the identification information of the PTT device 100.

A "subscriber identification information" is identification information of the subscribers of the first sub-network group, that is, identification information of one or more devices that can be the subscribers of the first message among the plurality of devices included in the network group 200.

A "sub-message serial number" is the serial number of each of sub-messages when the first message consists of a plurality of sub-messages. The sub-message serial number may include the total number (or a first serial number and a last serial number) of the plurality of sub-messages and the serial number of the sub-message included in a current packet.

A "delivery priority" is information indicating whether to prioritize the transmission of the first message. For example, in a case that the first message is a disaster information message, the priority is set to the first message.

A "message payload" indicates the content of the first message.

The information included in the first message illustrated in FIG. 4 is merely an example, and contained information, the order, and a packet structure of an actual first message may be variously changed. Further, in addition to the first message, other messages may be transmitted to the plurality of devices included in the network group 200.

For example, when the first message is changed or the lifecycle of the first message is changed, an additional message may be transmitted. Further, the first message may include a network location to which at least one subscriber of the first sub-network group transmits a response message that is, for example, an acknowledgement message for the first message to be described later. In addition, the first message may include time stamps for a plurality of sub-messages to be described later. Therefore, pieces of the information included in the first message illustrated in FIG. 4 are merely examples.

Next, the operation processor 150 receives the acknowledgement messages for the first message that may be transmitted from one or more devices that can be the subscribers of the first message (i.e., the subscribers of the first sub-network group) through the communication interface 110 (step S130).

For example, the PTT device 100-2 transmits an acknowledgement message for the first message, and the operation processor 150 receives the acknowledgement message for the first message transmitted from the PTT device 100-2 through the communication interface 110.

Since the acknowledgement message for the first message may be transmitted from each of the one or more devices in the first sub-network group, it is preferable that the communication interface 110 receives the acknowledgement message for the first message by using the unicast scheme.

Next, based on the acknowledgement message for the first message received through step S130, the operation processor 150 may retransmit at least part of the first message to the plurality of PTT devices included in the network group 200 or the one or more PTT devices of the first sub-network group through the communication interface 110 (step S140).

For example, when the PTT device 100-2 and the PTT device 100-4 normally receive the first message, each of the PTT device 100-2 and the PTT device 100-4 transmits an acknowledgement message that indicates the normal reception for the first message. In this case, step S140 is not executed.

On the contrary, for example, when the PTT device 100-2 normally receives the first message but the PTT device 100-4 receives only a part of the first message, the PTT device 100-2 transmits an acknowledgement message indicating the normal (complete) reception of the first message and the PTT device 100-4 transmits an acknowledgement message requesting a retransmission of the first message (e.g., a retransmission request for at least part of the first message). In this case, the operation processor 150 may perform step S140.

More specifically, the operation processor 150 may retransmit at least part of the first message by using the multicast scheme or the unicast scheme.

For example, the operation processor 150 may retransmit at least part of the first message to the plurality of PTT devices included in the network group 200 or the one or more PTT devices of the first sub-network group by using the multicast scheme. Alternatively, the operation processor 150 may retransmit at least part of the first message to the one or more PTT devices of the first sub-network group (more specifically, one or more PTT devices requesting the retransmission of the at least part of the first message) by using the unicast scheme.

Meanwhile, as described above, the first message may include the plurality of sub-messages. Specifically, the first message may include a first sub-message to an n-th sub-message (n is a natural number greater than or equal to 2).

In the case that the first message includes the first sub-message to the n-th sub-message, in step S120, the operation processor 150 transmits the first sub-message to the n-th sub-message of the first message to the plurality of devices included in the network group 200 through the communication interface 110 by using the publisher-subscriber pattern. Preferably, the operation processor 150 sequentially transmits the first sub-message to the n-th sub-message of the first message.

In the case that the first message includes the first sub-message to the n-th sub-message, the acknowledgement message for the first message received through step S130 may indicate whether each of the first sub-message to the n-th sub-message of the first message is received by each of the one or more PTT devices of the first sub-network group. In this case, in step S140, based on the acknowledgement message for the first message received through step S130, at least part of the first message, more particularly, at least one of the first sub-message to the n-th sub-message of the first message may be retransmitted to the plurality of PTT devices included in the network group 200 or the one or more PTT devices of the first sub-network group through the communication interface 110.

For example, in the case that the PTT device 100-2 normally receives the first message (that is, the PTT device 100-2 receives all of the first sub-message to the n-th sub-message of the first message) but the PTT device 100-4 fails to receive the n-th sub-message among the first sub-message to the n-th sub-messages of the first message, the PTT device 100-2 transmits an acknowledgement message indicating the normal (complete) reception of the first message and the PTT device 100-4 transmits an acknowledgement message in which the normal reception of the sub-messages except for the n-th sub-message is indicated and a retransmission of the n-th sub-message is requested. In this case, the operation processor 150 may retransmit the n-th sub-message of the first message through step S140. It is preferable that the operation processor 150 may retransmit the n-th sub-message of the first message to the PTT device 100-4 by using the unicast scheme. However, the operation processor 150 may retransmit the n-th sub-message of the first message to the plurality of PTT devices included in the network group 200 or the one or more PTT devices of the first sub-network group by using the multicast scheme.

In the above manner, through steps S130 and S140, the PTT device 100 guarantees the transmission of the first message to the plurality of PTT devices included in the network group 200 (more specifically, the one or more PTT devices of the first sub-network group). Therefore, the PTT service provided by the PTT device 100 may be applied to the mission-critical PTT service.

Figure 5:
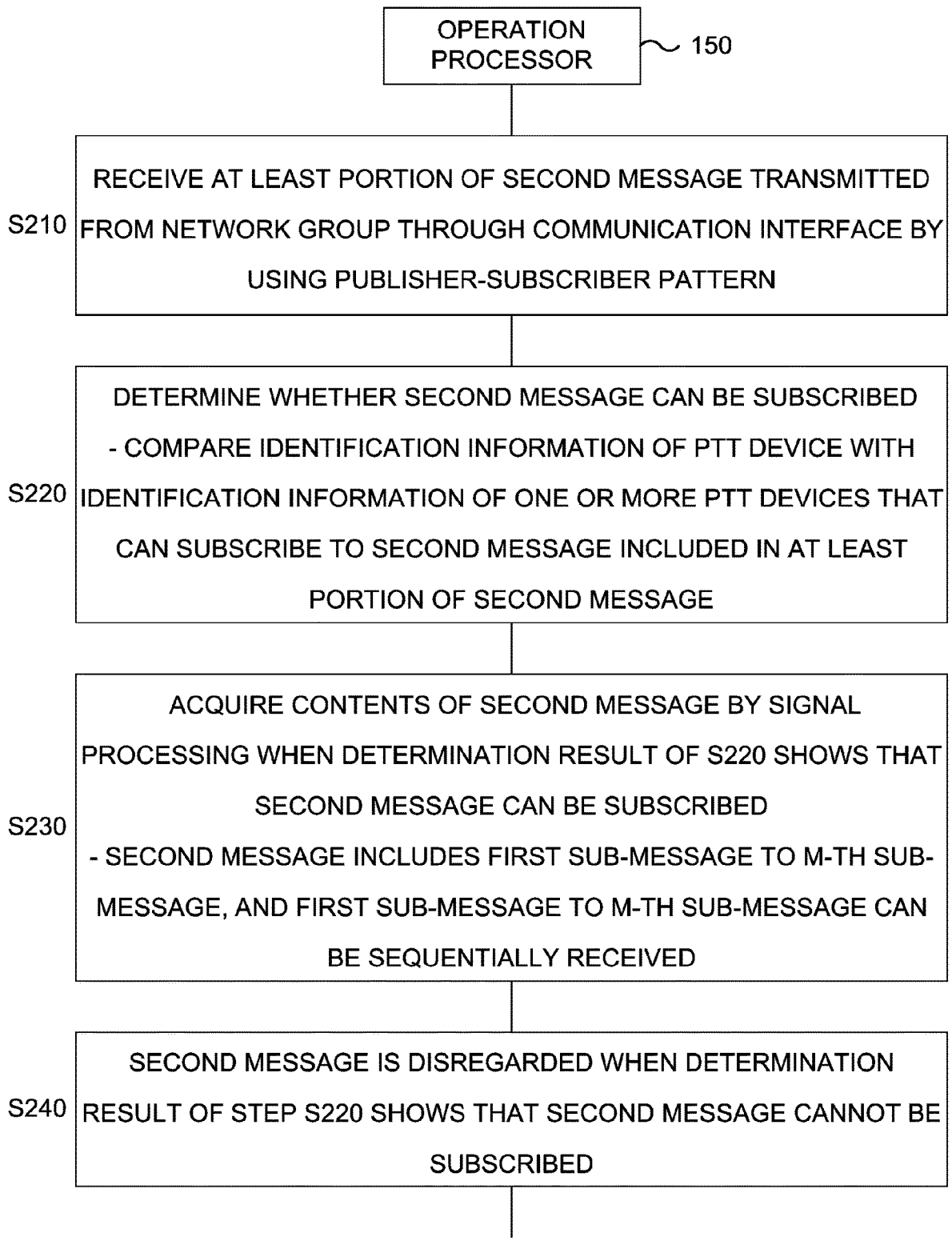
FIG. 5 is a diagram illustrating an example of processing performed by the operation processor of the PTT device according to the first embodiment.

FIG. 5 is a diagram illustrating an example of processing performed by the operation processor of the PTT device according to the first embodiment.

Referring to FIG. 5, the processing performed by the operation processor 150 of the PTT device 100 when the PTT device 100 receives a second message is exemplarily illustrated. Specifically, the second message may be, for example, the same as or different from the first message described above.

First, the operation processor 150 receives at least part of the second message transmitted from the network group 200 through the communication interface 110 by using a publisher-subscriber pattern (step S210).

Next, the operation processor 150 determines whether the second message of which at least part is received in step S210 can be subscribed (step S220). Step S220 may be performed based on a part of the second message. Herein, "a part of the second message" may indicate a header portion of a packet corresponding to the second message or metadata for the second message. Further, when the second message consists of a plurality of sub-messages, "a part of the second message" may indicate a portion of each of the plurality of sub-messages or a header portion of each of the plurality of sub-messages.

In step S220, the operation processor 150 compares the identification information of the PTT device 100 with the identification information included in at least part of the second message received in step S210, that is, the identification information of one or more PTT devices that can be the subscribers of the second message.

The second message has a structure substantially the same as a structure of the first message that is described above with reference to FIG. 4. That is, the second message includes, as the "subscriber identification information", identification information of one or more devices that can be the subscribers of the second message among the plurality of devices included in the network group 200. A "second sub-network group" of the network group 200 may be formed by the one or more devices that can be the subscribers of the second message among the plurality of devices included in the network group 200. The second sub-network group is a virtual network group.

The operation processor 150 may compare the identification information of the PTT device 100 with the subscriber identification information included in at least part of the second message received in step S210.

Next, when the determination result of step S220 shows that the second message can be subscribed, contents of at least part of the second message is acquired by signal processing the at least part of the second message (step S230).

In other words, when the subscriber identification information included in at least part of the second message received in step S210 includes the identification information of the PTT device 100, the PTT device 100 can subscribe to the second message. Accordingly, the operation processor 150 acquires contents of at least part of the second message by signal processing the at least part of the second message.

Further, when the determination result of step S220 shows that the second message cannot be subscribed, the second message is disregarded (step S240).

In other words, when the subscriber identification information included in at least part of the second message received in step S210 does not include the identification information of the PTT device 100, the PTT device 100 cannot subscribe to the second message. Accordingly, the operation processor 150 disregards the second message.

In the above manner, the PTT device 100 may receive the second message.

Figure 6:
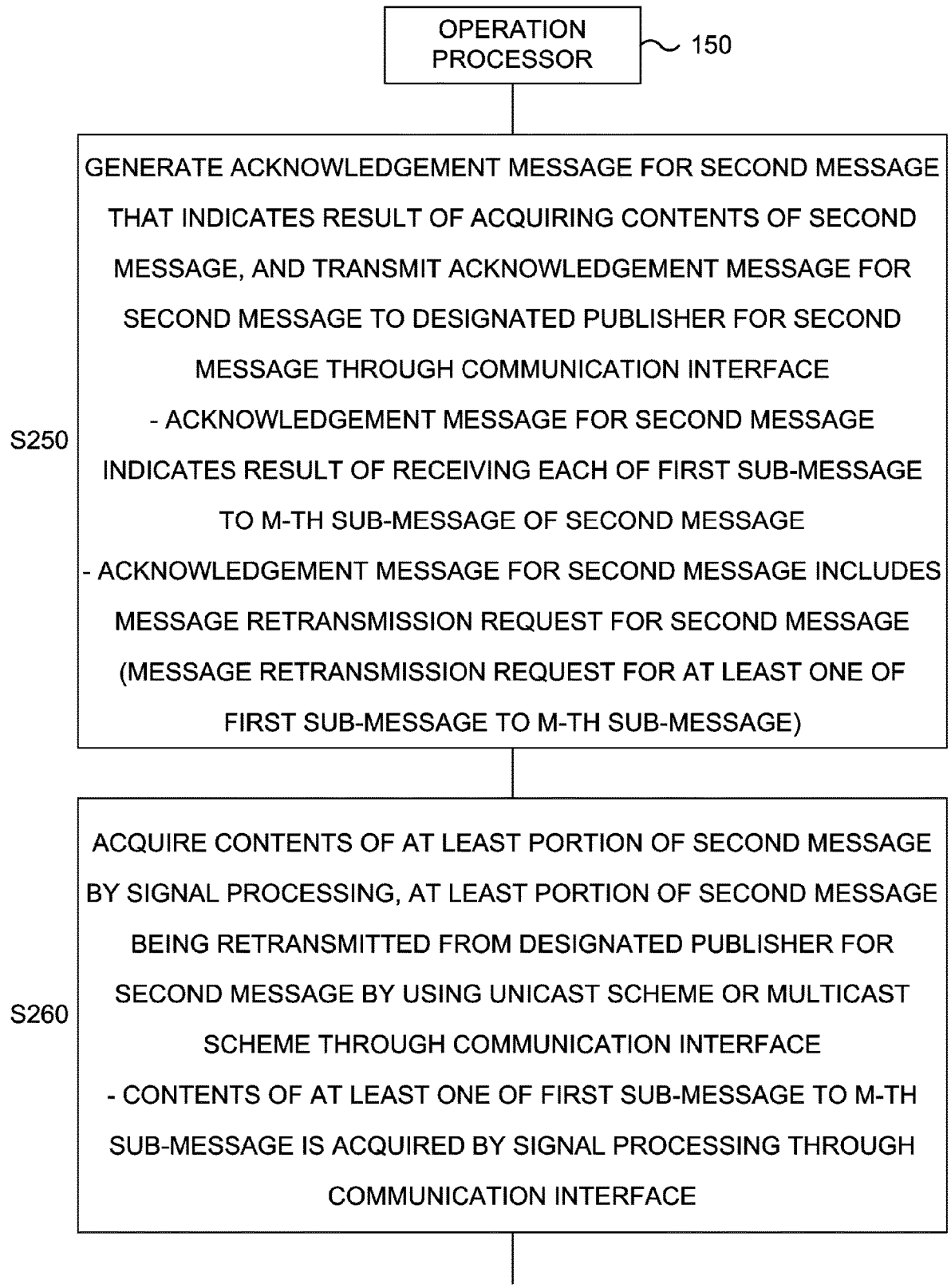
FIG. 6 is a diagram illustrating an example of processing performed by the operation processor of the PTT device according to the first embodiment.

FIG. 6 is a diagram illustrating an example of processing performed by the operation processor of the PTT device according to the first embodiment.

Referring to FIG. 6, the operation processor 150 generates an acknowledgement message for the second message that indicates the result of acquiring contents of at least part of the second message in step S230, and transmits the acknowledgement message for the second message to the designated publisher for the second message through the communication interface 110 (step S250).

The designated publisher for the second message may be identified, for example, by "publisher identification information" included in the second message.

For example, the communication interface 110 of the PTT device 100 transmits an acknowledgement message for the second message to the designated publisher for the second message through the communication interface 110.

Since the acknowledgement message for the second message is transmitted from the PTT device 100, it is preferable that the communication interface 110 transmits the acknowledgement message for the second message by using the unicast scheme.

For example, when the operation processor 150 of the PTT device 100 normally (completely) receives the second message, the operation processor 150 generates an acknowledgement message indicating the normal reception for the second message and transmits the acknowledgement message for the second message to the designated publisher of the second message through the communication interface 110.

For example, when the operation processor 150 of the PTT device 100 fails to receive at least part of the second message, the operation processor 150 generates an acknowledgement message requesting a retransmission of the second message (e.g., a retransmission request for at least part of the second message) and transmits the acknowledgement message for the second message to the designated publisher of the second message through the communication interface 110. That is, the acknowledgement message for the second message may include the message retransmission request for the second message.

Upon receiving the retransmission request for the second message, the publisher designated for the second message retransmits the at least part of the second message by using the unicast scheme or the multicast scheme.

The operation processor 150 of the PTT device 100 acquires contents of the at least part of the second message (i.e., the entire second message or the requested portion of the second message) by signal processing the at least part of the second message, the at least part of the second message being retransmitted from the designated publisher for the second message by using the unicast scheme or the multicast scheme through the communication interface 110 (step S260).

Accordingly, the operation processor 150 may obtain the entire contents of the second message by combining the portion of the contents of the second message acquired in step S230 and the other portion of the contents of the second message acquired in step S260.

Meanwhile, the second message may include a first sub-message to an m-th sub-message (m is a natural number greater than or equal to 2).

In the case that the second message includes the first sub-message to the m-th sub-message, in step S230, the operation processor 150 sequentially receives the first sub-message to the m-th sub-message of the second message transmitted from the network group 200 through the communication interface 110 by using the publisher-subscriber pattern.

Further, the acknowledgement message for the second message generated in step S250 may indicate whether each of the first sub-message to the m-th sub-message of the second message is received. For example, in step S250, in the case that the operation processor 150 fails to receive the m-th sub-message among the first sub-message to the m-th sub-message of the second message, the operation processor 150 may transmit an acknowledgement message in which the normal reception of the sub-messages except for the m-th sub-message is indicated and a retransmission of the m-th sub-message is requested. That is, the acknowledgement message for the second message may include the message retransmission request for at least one of the first sub-message to the m-th sub-message of the second message.

In step S260, the operation processor 150 of the PTT device 100 acquires contents of at least one of the first sub-message to the m-th sub-message of the second message by signal processing the at least one of the first sub-message to the m-th sub-message, the at least one of the first sub-message to the m-th sub-message of the second message being retransmitted from the designated publisher for the second message by using the unicast scheme or the multicast scheme through the communication interface 110.

In the above manner, even when the second message includes the first sub-message to the m-th sub-message, the operation processor 150 may acquire the entire contents of the second message including the first sub-message to the m-th sub-message by combining a portion of the contents of the second message acquired in step S230 and the other portion of the contents of the second message acquired in step S260, As described above, through steps S210 to S260, the PTT device 100 may reliably receive the second message. That is, even when the PTT device 100 receives only a portion of the second message, the remaining portion of the second message may be received through the retransmission request. Therefore, the second message can be reliably received.

With the PTT device 100 according to the first embodiment described above, various push-to-talk communications can be performed in one network session. For example, a plurality of PTT devices may transmit a message by designating a plurality of publishers within one network session.

Figures 7, 8:
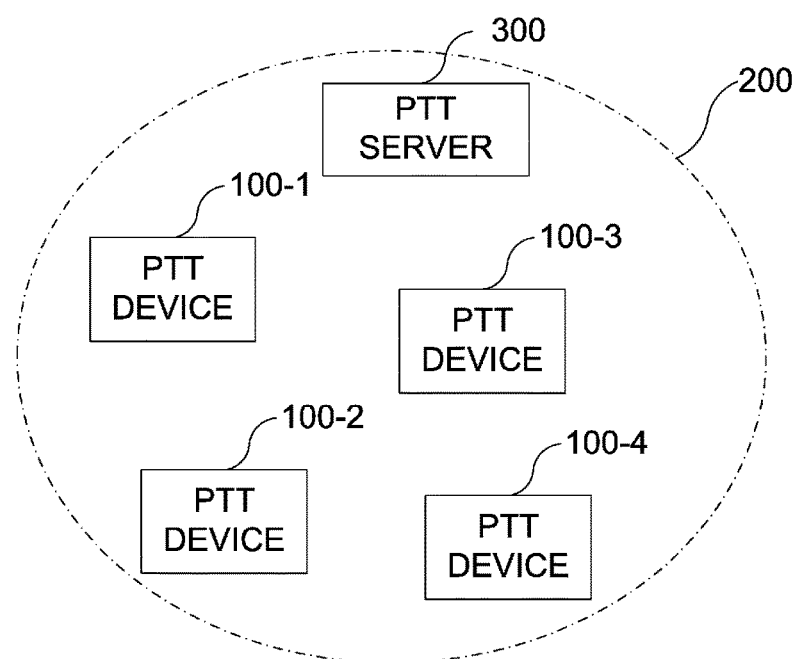
FIG. 7 is a diagram illustrating an example of a sub-network group of the PTT devices according to the first embodiment.
FIG. 8 is a diagram illustrating an exemplary environment in which a PTT device according to a second embodiment of the present disclosure is used.

FIG. 7 is a diagram illustrating an example of a sub-network group of the PTT devices according to the first embodiment. The sub-network group shown in FIG. 7 is merely an example, and the first embodiment is not limited thereto.

Referring to FIG. 7, a first sub-network group includes the PTT device 100-1 as a publisher and includes the PTT device 100-2 and the PTT device 100-4 as subscribers. In other words, a PTT service is provided between the PTT device 100-1, the PTT device 100-2, and the PTT device 100-4 while the PTT device 100-1 serves as a device having the floor. Further, since the PTT device 100-3 is not the subscriber, the PTT service according to the first sub-network group is not provided to the PTT device 100-3.

A second sub-network group includes the PTT device 100-2 as a publisher and includes the PTT device 100-1, the PTT device 100-3 and the PTT device 100-4 as subscribers. In other words, a PTT service is provided between the PTT device 100-1, the PTT device 100-2, the PTT device 100-3, and the PTT device 100-4 while the PTT device 100-2 serves as a device having the floor.

A third sub-network group includes the PTT device 100-1 and the PTT device 100-2 as publishers and includes the PTT device 100-3 and the PTT device 100-4 as subscribers. In other words, a PTT service is provided between the PTT device 100-1, the PTT device 100-2, the PTT device 100-3, and the PTT device 100-4 while the PTT device 100-1 and the PTT device 100-2 serve as devices having the floor. The floor may be appropriately granted between the PTT device 100-1 and the PTT device 100-2.

A fourth sub-network group includes the PTT device 100-1 as a publisher and the PTT device 100-2 as a subscriber. In other words, a PTT service is provided between the PTT device 100-1 and the PTT device 100-2 while the PTT device 100-1 serves as a device having the floor.

A fifth sub-network group includes the PTT device 100-2 as a publisher and includes the PTT device 100-1 as a subscriber. In other words, a PTT service is provided between the PTT device 100-1 and the PTT device 100-2 while the PTT device 100-2 serves a device having the floor.

When the fourth sub-network group and the fifth sub-network group are used, a two-way PTT service can be provided between the PTT device 100-1 and the PTT device 100-2. The PTT service according to the fourth sub-network group and the PTT service according to the fifth sub-network group may be simultaneously provided between the PTT device 100-1 and the PTT device 100-2.

As described above, according to the first embodiment, one-way PTT communication or two-way PTT communication can be performed between one-to-many or many-to-many devices.

Second Embodiment

The PTT service using the PTT device 100 according to the first embodiment described above may be provided in replacement of the conventional PTT service, or may be provided when the conventional PTT service does not operate normally.

A PTT device 100 according to a second embodiment is substantially the same as the PTT device 100 according to the first embodiment except that processing performed by an operation processor 150 of the second embodiment is different from that of the first embodiment. That is, the operation processor 150 of the PTT device 100 according to the second embodiment performs processing shown in FIG. 9 in addition to the processing performed by the operation processor 150 of the PTT device 100 according to the first embodiment.

FIG. 8 is a diagram illustrating an exemplary environment in which the PTT device according to the second embodiment is used, and FIG. 9 is a diagram illustrating an example of processing performed by the operation processor of the PTT device according to the second embodiment.

As shown in FIG. 8, according to the second embodiment, a plurality of PTT devices, for example, the PTT device 100-1, the PTT device 100-2, the PTT device 100-3, and the PTT device 100-4 are disposed in the network group 200. Although the case having the four PTT devices 100-1 to 100-4 is described as an example in the second embodiment, the number of PTT devices that can be disposed in the network group 200 is not limited thereto. For example, 10,000 PTT devices may be disposed in the network group 200. Each or all of the plurality of PTT devices, for example, the PTT devices 100-1 to 100-4 in the network group 200 may used as the PTT device 100 according to the second embodiment. Further, a push-to-talk server (PPT server) 300 is disposed. Here, the PPT server 300 is disposed within the network group 200. However, the PTT server 300 may also be disposed outside the network group 200.

The PPT server 300 provides the conventional PTT service between the PTT device 100-1, the PTT device 100-2, the PTT device 100-3, and the PTT device 100-4.

Referring to FIG. 9, the operation processor 150 of the PTT device 100 according to the second embodiment determines whether to execute the above-described steps S110 and S120 based on a predetermined policy (step S310). Similarly, the operation processor 150 of the PTT device 100 according to the second embodiment may determine whether to execute the above-described steps S210 and S220 based on a predetermined policy.

The predetermined policy may include, for example, at least one of a network status, a demand on delivery guarantee, and a specific input from a user.

For example, while the PPT server 300 provides the conventional PTT service between the PTT device 100-1, the PTT device 100-2, the PTT device 100-3, and the PTT device 100-4, if the PPT server 300 is out of order or fails to provide a normal PTT service due to an increase of a communication load, the operation processor 150 of the PTT device 100 according to the second embodiment determines in step S310 that it is necessary to execute steps S110 and S120 (or steps S210 and S220).

When it is necessary to transmit a message requiring delivery guarantee between the PTT device 100-1, the PTT device 100-2, the PTT device 100-3, and the PTT device 100-4, the operation processor 150 of the PTT device 100 according to the second embodiment may determine in step S310 that it is necessary to execute steps S110 and S120 (or steps S210 and S220).

In addition, when a specified input from a user is received (for example, the specified input may be input by the user of the PTT device 100 according to the second embodiment), the operation processor 150 of the PTT device 100 according to the second embodiment may determine in step 310 that it is necessary to execute steps S110 and S120 (or steps S210 and S220).

Next, the operation processor 150 of the PTT device 100 according to the second embodiment executes steps S110 and S120 based on the determination result of step S310 (step S320). When the operation processor 150 of the PTT device 100 according to the second embodiment determines whether to execute the above-described steps S210 and S220 based on a predetermined policy, steps S210 and S220 may be executed based on the determination result.

As described above, according to the second embodiment, the PTT service using the PTT device 100 according to the first embodiment can be provided in replacement of the conventional PTT service, for example, when the conventional PTT service does not operate normally.

Other Embodiments

Although the embodiments of the technique described in the present disclosure have been described in detail, the presently disclosed embodiments are considered in all respects to be illustrative and not restrictive. Further, for those of ordinary skill in the art to which the technique described in the present disclosure pertains, the above-described embodiments may be omitted, replaced, or changed in various forms without departing from the scope of the technique described in the present disclosure.

Accordingly, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

INDUSTRIAL APPLICABILITY

According to the technique described in the present disclosure, a push-to-talk service using a publisher-subscriber pattern is provided so that the push-to-talk service can be used as a mission-critical PTT service with which a message is delivered regardless of the use of a server and the message delivery is guaranteed, and also can provide one-way communication or two-way communication between one-to-many or many-to-many devices. Further, by transmitting the message using the multicast scheme, it is possible to reduce the bandwidth required to transmit the message. Further, it is also possible to provide various types of device-to-device communication within one network session.

What is claimed is:

1. A push-to-talk device comprising:
a communication interface;
a storage configured to store identification information of a plurality of push-to-talk devices included in a network group; and
an operation processor electrically connected to the communication interface and the storage,
wherein the operation processor is configured to:
(a) designate one or more push-to-talk devices that are allowed to subscribe to a first message among the plurality of push-to-talk devices,
(b) transmit the first message to the plurality of push-to-talk devices by using a publisher-subscriber pattern through the communication interface;
(c) receive at least part of a second message, which is transmitted from the network group, by using the publish-subscribe pattern through the communication interface;
(d) determine whether the second message is allowed to be subscribed;

(e) acquiring contents of the at least part of the second message by signal processing the at least part of the second message when it is determined in (d) that the second message is allowed to be subscribed; and
(f) disregard the second message when it is determined in (d) that the second message is not allowed to be subscribed,
wherein, in (d), the operation processor compares identification information of one or more push-to-talk devices that are allowed to subscribe to the second message included in the second message with identification information of the push-to-talk device.

2. The push-to-talk device of claim 1, wherein the first message includes identification information of one or more push-to-talk devices serving as publishers of the publisher-subscriber pattern and identification information of the other one or more push-to-talk devices serving as subscribers of the publisher-subscriber pattern that are allowed to subscribe to the first message.

3. The push-to-talk device of claim 1, wherein the operation processor is further configured to (g) receive acknowledgement messages for the first message transmitted from the one or more push-to-talk devices that are allowed to subscribe to the first message through the communication interface.

4. The push-to-talk device of claim 3, wherein the communication interface receives the acknowledgement messages for the first message by using a unicast scheme.

5. The push-to-talk device of claim 3, wherein the operation processor is further configured to (h) based on the acknowledgement messages for the first message, retransmit at least part of the first message to the plurality of push-to-talk devices or the one or more push-to-talk devices that are allowed to subscribe to the first message through the communication interface.

6. The push-to-talk device of claim 5, wherein, in (h), the at least part of the first message is retransmitted using a multicast scheme or the unicast scheme.

7. The push-to-talk device of claim 5, wherein the first message includes a first sub-message to an n-th sub-message where n is a natural number greater than or equal to 2, and,
in (b), the operation processor sequentially transmits the first sub-message to the n-th sub-message of the first message to the plurality of push-to-talk devices through the communication interface.

8. The push-to-talk device of claim 7, wherein each of the acknowledgement messages for the first message indicates whether each of the first sub-message to the n-th sub-message of the first message is received by the one or more push-to-talk devices that are allowed to subscribe to the first message, and,
in (h), the operation processor retransmits, based on each of the acknowledgement messages for the first message, at least one of the first sub-message to the n-th sub-message of the first message to the plurality of push-to-talk devices or the one or more push-to-talk devices that are allowed to subscribe to the first message through the communication interface.

9. The push-to-talk device of claim 1, wherein the operation processor (i) generates an acknowledgement message for the second message indicating a result of acquiring the contents of the at least part of the second message from (e), and transmits the acknowledgement message for the second message to a designated publisher for the second message through the communication interface.

10. The push-to-talk device of claim 9, wherein the communication interface transmits the acknowledgement message for the second message by using a unicast scheme.

11. The push-to-talk device of claim 9, wherein the acknowledgement message for the second message include a message retransmission request for the second message, and
the operation processor is further configured to (j) acquire, through the communication interface, contents of at least part of the second message retransmitted from the designated publisher for the second message by signal processing the at least part of the second message.

12. The push-to-talk device of claim 11, wherein the second message includes a first sub-message to an m-th sub-message where m is a natural number greater than or equal to 2, and
the acknowledgement message for the second message indicates whether each of the first sub-message to the m-th sub-message of the second message is received.

13. The push-to-talk device of claim 12, wherein the acknowledgement message for the second message includes a message retransmission request for at least one of the first sub-message to the m-th sub-message of the second message, and,
in (j), the operation processor acquires, through the communication interface, contents of the at least one of the first sub-message to the m-th sub-message of the second message retransmitted from the designated publisher for the second message by signal processing the at least one of the first sub-message to the m-th sub-message of the second message.

14. The push-to-talk device of claim 1, wherein the operation processor is further configured to:
(k) determine whether to execute (a) and (b) based on a predetermined policy; and
(l) execute (a) and (b) based on a determination result of (k).

15. The push-to-talk device of claim 14, wherein the predetermined policy includes at least one of a network status, a demand on delivery guarantee, and a specific input from a user.

16. The push-to-talk device of claim 1, wherein the publisher-subscriber pattern includes a data distribution service (DDS).

* * * * *